United States Patent
Desai et al.

(10) Patent No.: US 7,890,746 B2
(45) Date of Patent: Feb. 15, 2011

(54) AUTOMATIC AUTHENTICATION OF BACKUP CLIENTS

(75) Inventors: Asit A. Desai, San Ramon, CA (US); Richard C. Zulch, Orinda, CA (US)

(73) Assignee: EMC Corporation, Hopkinton, MA (US)

( * ) Notice: Subject to any disclaimer, the term of this patent is extended or adjusted under 35 U.S.C. 154(b) by 1414 days.

(21) Appl. No.: 11/347,124

(22) Filed: Feb. 3, 2006

(65) Prior Publication Data

US 2007/0203957 A1    Aug. 30, 2007

(51) Int. Cl.
H04L 29/06    (2006.01)
(52) U.S. Cl. ..................................... 713/150
(58) Field of Classification Search ............... 713/150
See application file for complete search history.

(56) References Cited

U.S. PATENT DOCUMENTS

| | | | | |
|---|---|---|---|---|
| 6,925,182 | B1* | 8/2005 | Epstein ..................... | 380/277 |
| 2002/0116637 | A1* | 8/2002 | Deitsch et al. .............. | 713/201 |
| 2002/0157010 | A1* | 10/2002 | Dayan et al. ................ | 713/191 |
| 2002/0178398 | A1* | 11/2002 | Sekiguchi .................... | 714/4 |
| 2003/0172262 | A1* | 9/2003 | Curry .......................... | 713/156 |
| 2003/0188180 | A1* | 10/2003 | Overney ...................... | 713/193 |
| 2003/0196052 | A1* | 10/2003 | Bolik et al. .................. | 711/162 |
| 2003/0196059 | A1* | 10/2003 | Satagopan et al. ........... | 711/169 |
| 2005/0091171 | A1* | 4/2005 | Grobman ...................... | 705/64 |
| 2005/0102522 | A1* | 5/2005 | Kanda .......................... | 713/176 |
| 2006/0010174 | A1* | 1/2006 | Nguyen et al. ............... | 707/202 |
| 2006/0026670 | A1* | 2/2006 | Potter et al. .................... | 726/7 |
| 2006/0129685 | A1* | 6/2006 | Edwards et al. .............. | 709/229 |

* cited by examiner

*Primary Examiner*—Nasser Moazzami
*Assistant Examiner*—Michael S McNally
(74) *Attorney, Agent, or Firm*—Barry N. Young

(57) ABSTRACT

A method of automatically authenticating clients on a computer system network enables clients on the network to be automatically logged in and added to a backup database and assigned for backup. The method employs a public key/private key encryption system in which clients have a public key and the backup server has a private key. The backup server interrogates new clients to determine client status and whether the client supports the public key/private key certificate. If it does, the backup server uses key values from the client decrypted using its private key to generate encryption keys which are employed in an algorithm for securely communicating with the client to log the client into a backup database. Otherwise, the backup server uses a password entered by a user in the client for generating the encryption keys. Additionally, the method enables backup software and public keys to be automatically push installed on the clients.

20 Claims, 4 Drawing Sheets

AUTOMATIC AUTHENTICATION OF BACKUP CLIENTS

CROSS REFERENCE TO RELATED APPLICATIONS

This application is related to commonly-owned co-pending application filed concurrently herewith and entitled "Automatic Classification of Backup Clients" Ser. No. 11/347,759.

BACKGROUND OF THE INVENTION

This invention relates generally to methods and systems for backing up computer data in computer systems, and more particularly to the authentication of client computers for installation of backup software and the backup of the clients.

Computer systems store data that is unique and often critical, and, if lost, would frequently be expensive, difficult or impossible to replace. The data is normally stored on hard disks or other storage devices which are subject to the possibility of failure. Additionally, data may also be lost by theft, fire or other disaster, and frequently the data lost is permanent. Accordingly, backup methods and systems have been developed to maintain controlled redundancy of data to enable data to be recovered in the event of a disaster and to avoid or minimize the loss of the data.

Backup systems copy source data from a computer source storage volume to backup media so that if the original source data is lost, it may be restored from the backup copy. Since data in a computer system is continuously being created or modified, it is important that backup be performed frequently to ensure that the backup copy of the data is current. Most backup in large systems is batch-oriented and performed at predetermined times during a backup window, such as at night when the computer system is not being used for normal processing operations. In computer systems having a plurality of interconnected computers, such as a network, one computer, referred to as a backup computer or a backup server, may manage the backup process and copy source data from the other interconnected computers on the network, referred to as backup client computers or simply as "clients", to backup media. The backup server executes a backup software application that manages the backup process, and the client computers execute client backup applications that cooperate with the backup server application and read source data from source volumes and forward the data to the backup server for backup.

Generally, a system administrator must install the client backup software application on each client machine and assign an access password to the machine. Passwords are necessary to authenticate clients, and used to ensure that an unauthorized or another copy of backup server software does not obtain access to the client's data. The access passwords must then be logged into the backup server so that the backup server can subsequently access the clients for backup. In enterprises having many different clients, it is a time-consuming and burdensome process to install the client backup software application on each client machine, assign a password, and then log the password for the client machine with the backup server. The administrator must physically go to each client machine to manually install the client software and to log each password with the backup server. Automated tools exist that enable an administrator to "push install" new programs on a machine connected to a network. Examples are Microsoft's SMS Server or SSH push installation protocols. However, these are designed to install uniform software on multiple computers, and do not resolve difficulties such as distributing unique passwords or other security credentials to multiple machines. Moreover, in large enterprises, new clients are continually being added to the network, and this imposes a continuing burden on administrators of repeating the backup software installation process for each new machine.

In addition to installing client backup software onto a client computer, the client computer must be logged into a backup database of the backup server in order to be backed up. This involves authentication and is also typically a manual process. The user must enter a password and certain information, such as encryption keys, that enable the backup server to communicate securely with the client computer to login and add it to the backup database. Adding new clients to a backup database imposes a further burden on systems administrators.

Another backup problem faced by some is ensuring that clients that connect to a network infrequently or that may have never connected to the network are properly backed up. Large enterprises, for example, may have a number of geographically separated sites, each having its own local area network ("LAN") connected to the enterprise wide area network ("WAN"), and each LAN having its own local backup server for backing up clients on that LAN. Frequently, mobile clients, such as laptop computers, may travel between the different sites, and connect to local LANs. In such situations, there is no way to automatically authenticate a mobile client on the local site's LAN, since the mobile client's password is on the client's home network backup server. Thus, the mobile client does not get backed up during the local site's backup session, unless a systems administrator manually sets up the visiting client on the backup system.

It is desirable to provide backup systems and methods which avoid the foregoing and other problems of known backup approaches by facilitating the installation of client backup software and authentication of clients. It is to these ends that the present invention is directed.

DESCRIPTION OF PREFERRED EMBODIMENTS

The present invention is particularly well adapted to authenticating and backing up client computers in an enterprise computer system network, and will be described in that context. As will be appreciated, however, this is an illustrative of only one utility of the invention.

Figure 1:
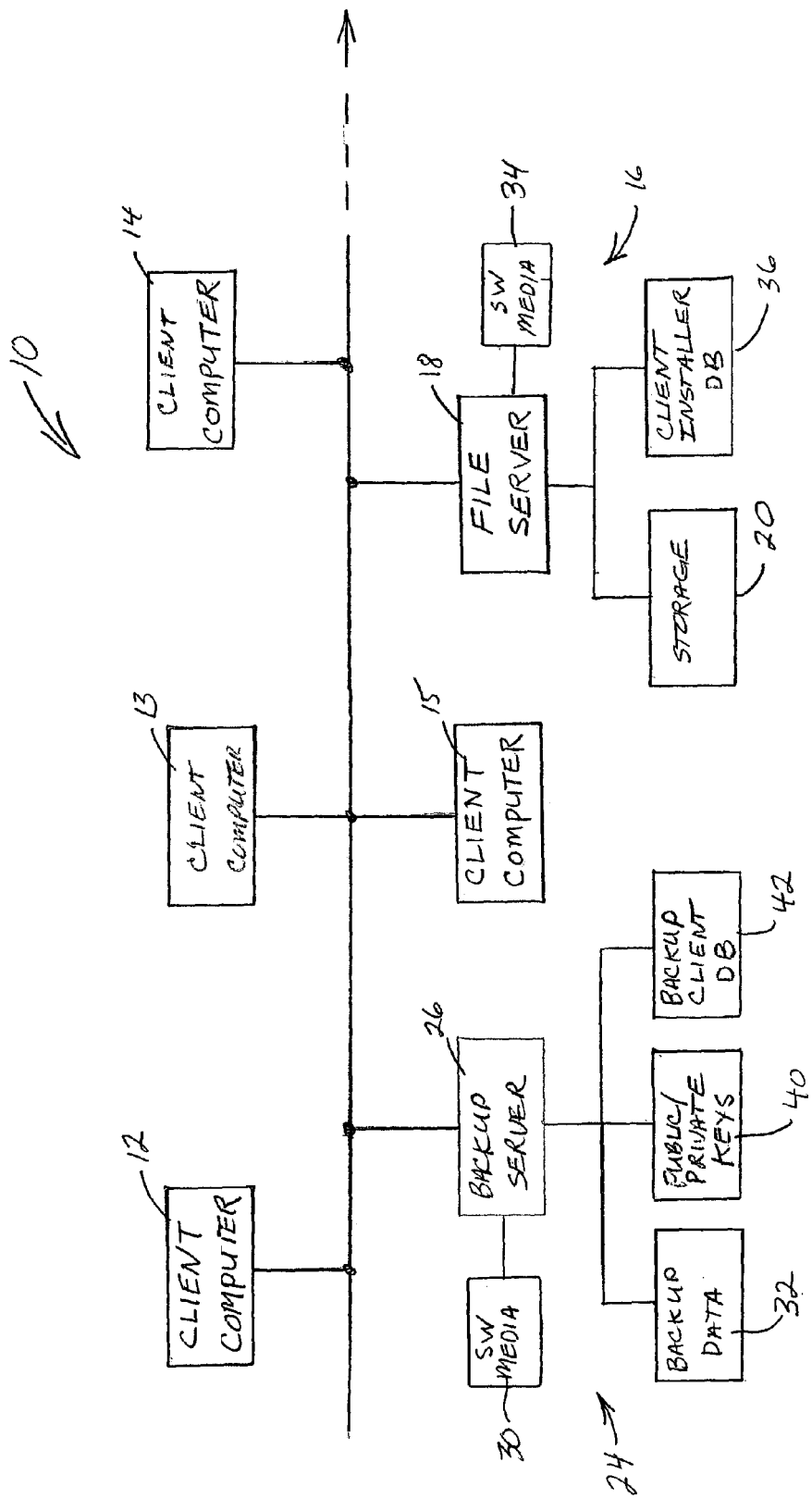
FIG. 1 is a block diagram of a computer system network of the type with which the invention may be employed.

FIG. 1 is a block diagram of a computer system network 10 of the type with which the invention may be employed. Computer network 10 may be a standalone network, or a local area network (LAN) or a subnet of a wide area network (WAN) of a larger enterprise, for example. Network 10 may comprise a plurality of interconnected computers including, for example, servers, desktop computers, mobile computers such as laptop computers, and appliances of various types. As shown in the figure, the interconnected computers may comprise a plurality of computers 12-15 which are referred to herein as "client computers" or simply as "clients" and one or more server computer systems, such as a file server system 16 comprising a file server computer 18 and storage 20. The network may further comprise a backup computer system 24 comprising a backup server 26 that may provide centralized backup for the computers on network 10. The backup server may simply be another computer on the network that executes a backup software computer program comprising machine executable instructions stored on computer readable media 30 that controls the backup server 26 to perform a backup process. The backup process backs up source data from client computers 12-15 and from file server system 16 to backup media 32 to provide a redundant data set. Client computers 12-15 and file server 18 may each also execute client backup software applications that may be included on software media 30 of the backup server and/or on another computer readable media 34 and input to storage 20 of file server 18. The client backup software application may be installed on the client computers, from the backup server or from the installer storage 34 file server as will be described in more detail shortly. The client backup software on file server storage 20 may be loaded from media 30 of the backup server, or, alternatively, may be loaded from computer readable media 34 that inputs the software to a client installer storage location 36 of the file server.

As further shown in FIG. 1, the backup server may also comprise storage 40 for public key/private key certificate files. Additionally, backup server system 24 may include a backup client database 42 which stores a list of network clients which have been logged into the backup server for backup service. As will be described, during a backup process, the backup server uses the public key/private key certificate files 40 and the information in the backup client database 42 to authenticate and back up clients on the network.

In order to backup a client on the network 10, it is necessary that the client have the client backup software application installed. Moreover, in order to prevent access to the client's data by an unauthorized or simply another copy of backup software, it is necessary that there be an authentication process for the client and backup server in order to preclude access to the client's data by unauthorized backup programs. In the past, one technique that has been employed to limit access to clients on a network has been to install a password in each client and require that an accessing computer have the client's password in order to access the client. However, it is also necessary to have the client password in order access the client to install software on the client. Thus, the use of a password to authenticate and access clients has been problematic because it has required a system administrator, or a user, to physically go to a client machine and to manually initiate the software installation process, and upload the password to a backup server so the client can be backed up. In networks with many client machines, especially in enterprises which may have hundreds of clients, it is a time-consuming and burdensome process to manually install client backup software applications on each client machine, and then log a password for each client with the backup server to enable authentication of the client in order for backup to be performed. Accordingly, in networks with many clients that are constantly being added to and taken off of the network, properly setting up clients for backup has been a very inefficient process.

Figure 2:
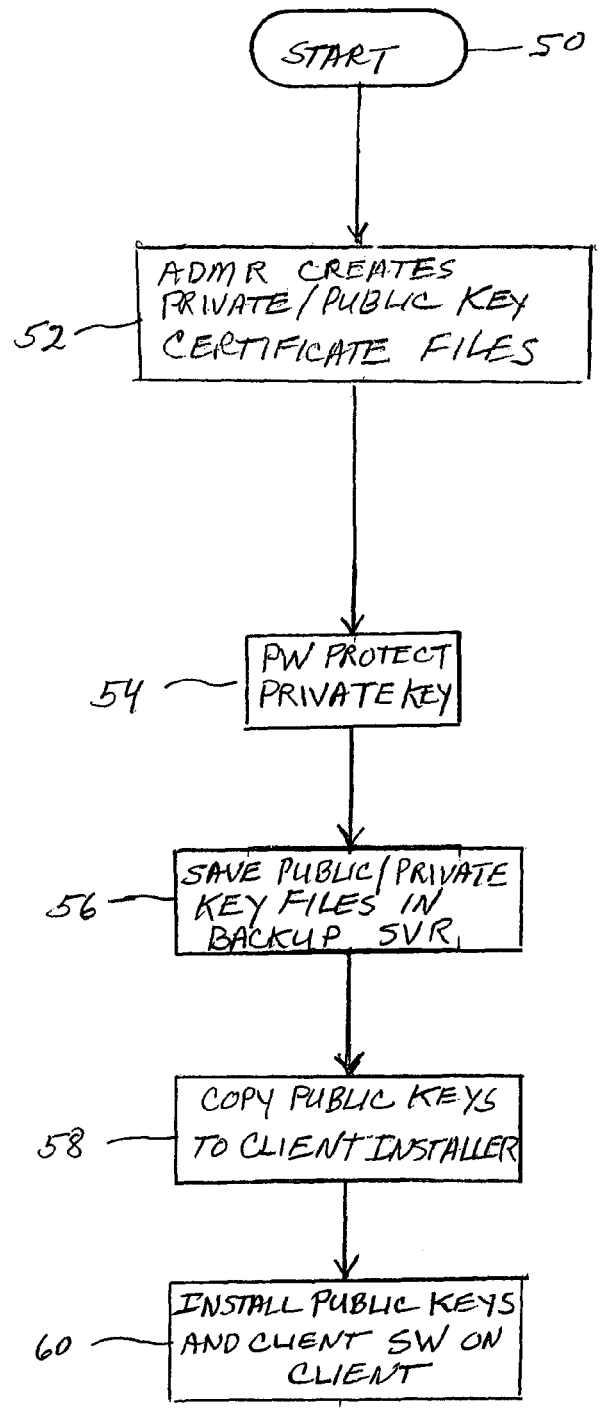
FIG. 2 is a flowchart illustrating a process for installing backup software on client computers.

FIG. 2 illustrates a preferred embodiment of a process which avoids the necessity of a system administrator physically accessing a client in order to set up an authentication mechanism for the client and to install backup software in the client. As will be described, in the process as illustrated in FIG. 2, a public key encryption system is employed to enable the backup server to be authenticated with the client computer for backup and for communication with the backup server.

Referring to FIG. 2, in accordance with the preferred process, the process begins at 50. A system administrator first creates at 52 a private key/public key certificate file containing, preferably, a plurality of different private/public key certificates. For example, there may be ten private/public key certificate pairs included in the file, each of which may correspond to and be used with, for example, a different backup server of a different LAN of an enterprise. Next, at step 54 the administrator password protects the private key certificate, and at step 56 stores the protected private key and the public key certificate files at the backup server. The private key certificate file is stored only at the backup server, since this private key is used for decryption and it must be stored securely. Otherwise, anyone with access to the private key file would have access to all of the clients that were installed with the corresponding public key. In accordance with an alternative embodiment, the administrator may password protect and store multiple private keys of the set of public/private key pairs on the backup server. This conveniently enables clients on other networks that may use a particular one of the private keys to be authenticated and connected to the backup server.

Next, at step 58 of FIG. 2, the public key certificate files may be copied to the client installer database 36 of storage 20 of file server 16. When a new client machine is installed on the network, the public key certificate files and the client backup software from the client installer database 36 may be installed automatically and together on the new client machine, as shown at step 60 of FIG. 2. The public key certificate files and the backup software are preferably installed together on the new client, because the new client will require the appropriate public key to communicate with the backup server 26 in order to be backed up.

There are several advantages of using a public key for authentication rather than a password. One advantage is that the public keys and the client backup software may be stored at one or more storage locations on the network, and installed simultaneously and automatically on a client machine, as by using conventional push software technology such as Microsoft SMS to silently install the client software application on each client machine. This permits an administrator to quickly and easily set up new client machines on the network with the appropriate backup software and public keys to enable them to be backed up, without the necessity of physically going to each machine and manually installing the software and keys. This is a significant time saver, and permits a large number of client machines to be easily and quickly added to the network and provided with client backup software to enable them to be backed up on the backup server.

Moreover, using a public key system for secure communications between client machines and the backup server is advantageous for another reason. All client machines on the network can use the same public key corresponding to the private key stored on the backup server on that network to establish communications and facilitate authentication. Also, by installing multiple public keys on a client machine that correspond to private keys on other servers, clients can operate with other server without having to reestablish credentials.

Furthermore, a large enterprise may have a plurality of geographically separate sites. By assigning a different private key to the backup server at each site and installing a plurality of public keys on a mobile client corresponding to the plurality of backup server private keys, should the client travel to a different one of the geographically separated sites, the visiting mobile client will be able to communicate with the backup server at that site using the appropriate public key for that backup server. This will enable authentication so the local backup server can automatically add the visiting client to its backup client database, and enable the backup server to back up the visiting client on the backup server's backup media.

Figure 3:
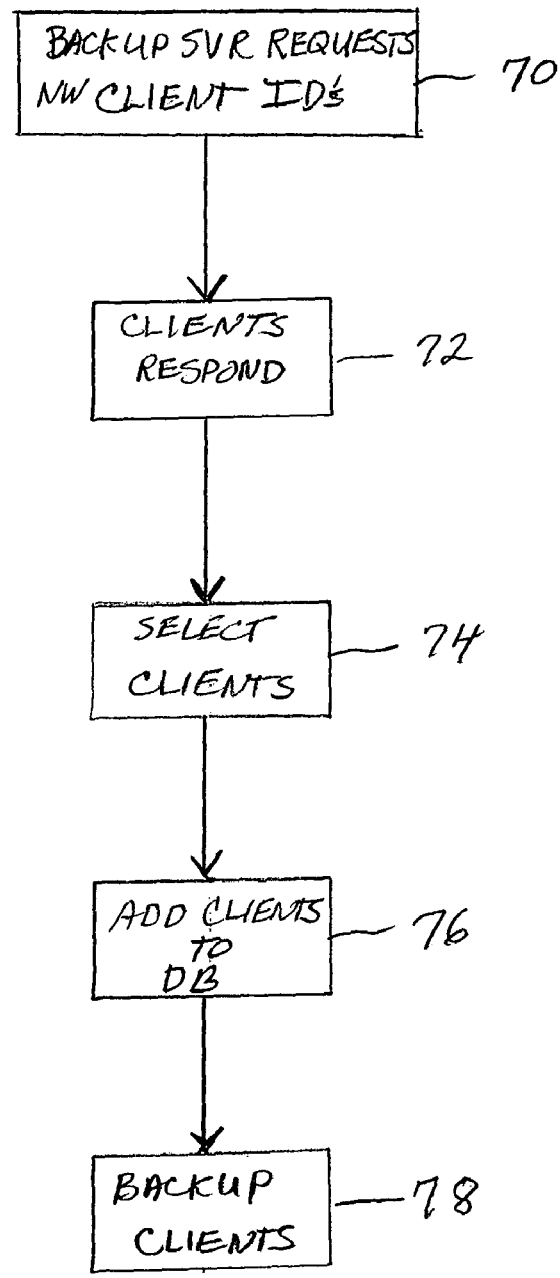
FIG. 3 is a flowchart illustrating a process for identifying clients for backup.

FIG. 3 illustrates a preferred embodiment of a process by which a backup server 26 identifies clients on network 10 and selects the clients for adding to the client backup database 42 to enable the clients to be backed up. In order for the backup server to add new clients to the database, it must first identify the new clients. As shown in FIG. 3, the backup server begins this process as indicated at 70 by broadcasting a request to all clients on the network to identify themselves. At 72, the clients on the network respond by sending their identifiers (IDs) in the clear to the backup server. The backup server uses the client IDs to select clients, at 74, that have already been logged in to the database and that should be backed up. The backup server also identifies at 74 any new clients on the network that need to be added to the backup database. The new clients may then be added to the database for backup, as indicated at 76, and as explained in more detail in connection with FIG. 4. After the clients have been added to the database, they may be backed up, as indicated at 78.

The process illustrated in FIG. 3 to identify new clients may be performed automatically at one or more predetermined times during the day according to predefined backup scripts stored in the backup server. The process identifies any new clients on the network, whether they are newly added clients or visiting clients from another network, so that the clients may be added to the backup process.

Figure 4:
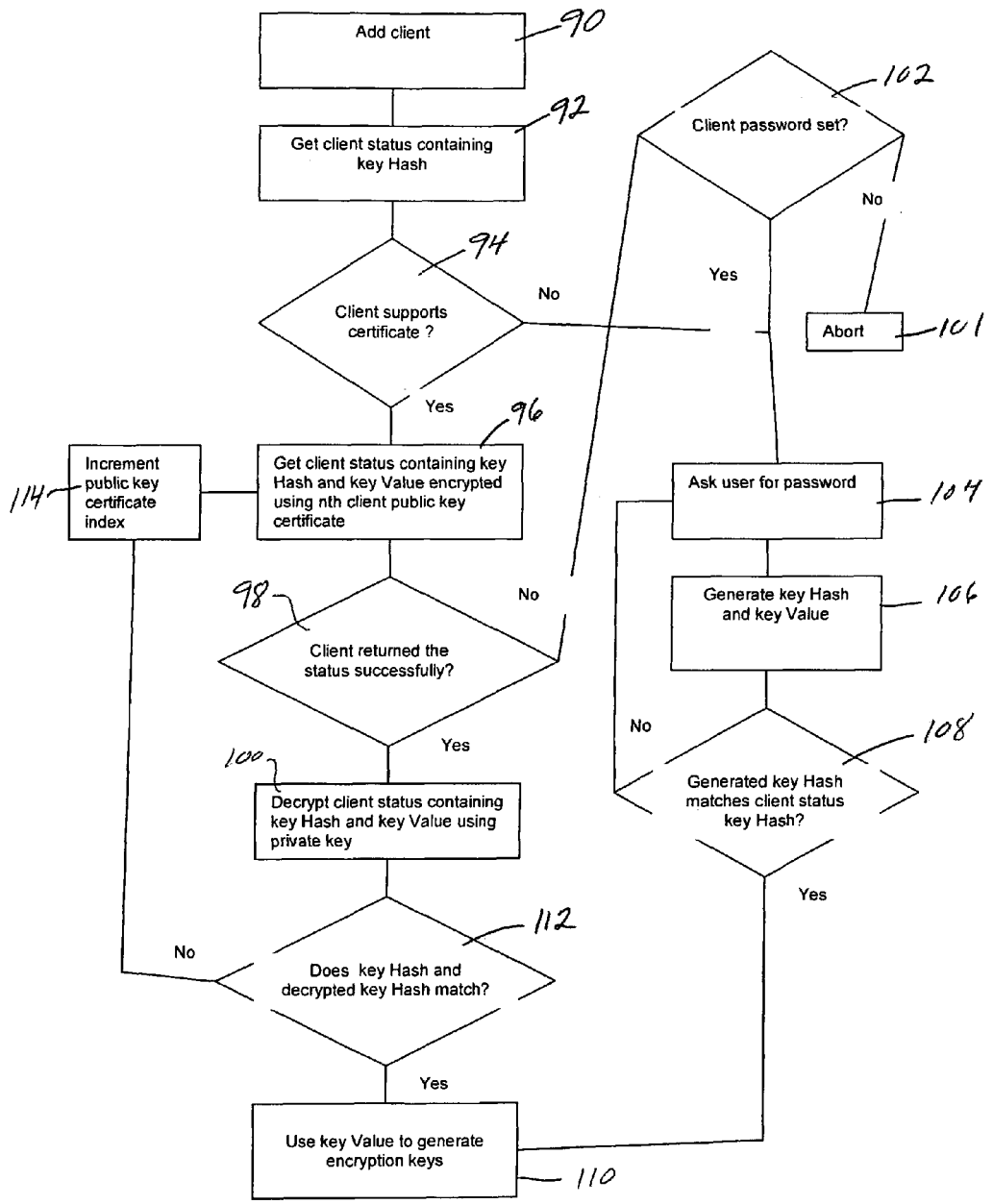
FIG. 4 is a flowchart illustrating a process for automatically adding new clients to a backup client database.

FIG. 4 illustrates a preferred embodiment of a client add process for adding new clients to the backup database identified in the process of FIG. 3. This add process, which corresponds to step 76 in FIG. 3, is performed by the backup server and adds any new clients identified on the network to the backup database so that they may be backed up.

In FIG. 4, the client add process begins at step 90. At step 92, the backup server obtains from a client the client status comprising, for example, information about the client's name, an identifier for the client, and the type of client machine including the platform and the operating system that is running on the client machine. This is information which is usually stored on the client, in configuration files, for example, and which the client conveys in response to a request from the backup server. Included with the client status is, preferably, a key hash, comprising, for example, a hash, such as an SHA-1 hash of a random key generated by the client. This status information, including the key hash, may be sent as plain text to the backup server. At step 94, the backup server determines whether the client supports a public/private key certificate, or whether the client uses a password. It may do this from the client's status information by determining the version of the client backup software that is installed on the client and whether this software supports the public key certificate. If the client does support the certificate, at step 96 the backup server obtains the client status containing the key hash and a key value encrypted using the nth client public key certificate. The $n^{th}$ client public key certificate may be one of the plurality of public key certificates installed on the client. At step 98, the server determines whether the client returned the status successfully, and at 100 determines whether it can decrypt the key value using its private key. If the client did not successfully return the status at 98, the process branches to step 102 to determine whether the client has a password set. If not, the process aborts at step 101. If a password has been set, the process then proceeds to step 104 where it asks the user for the password, generates a key hash and key value at step 106 using the same algorithm and same key value as used by the client, and determines whether the generated key hash matches the client status key hash at step 108. If it does not, the process returns to step 104 and asks the user for another password. If the generated key hash matches the client status key hash at step 108, the process branches to step 110 where the backup server uses the key value to generate encryption keys for communicating further with the client to log the client in for backup. Communications with the client are preferably encrypted using an encryption algorithm embodied in the backup software on the backup server and the key value generated by the client.

Returning to step 100, after decrypting the information from the client using its private key, at step 112, the key hash sent by the client at step 92 is compared with the decrypted key hash sent by the client at step 96 to determine whether the key hashes match. If they do, the process proceeds to step 110 where the key value is used to generate encryption keys, as described above. If, at step 112, the key hashes do not match, the process proceeds to step 114 where the public key certificate index is incremented by the backup server, and then the process returns to step 96 where the client status is obtained using the next $(n+1^{st})$ public key certificate. The process then repeats using different public keys until a match is obtained at step 112.

Following the generation of encryption keys at step 110, the backup server communicates with the client using the encryption keys in the encryption algorithm, as explained above. The new client is logged in and added to the backup client database. Thereafter, the new client will be backed up by the server, as indicated at step 80 of the process of FIG. 3.

As will be appreciated form the foregoing, the automatic authentication process of the invention affords a number of advantages and addresses a number of problems that are extant in many known backup processes. By using public key encryption to secure communications between the client computer and the backup server, and authentication, a process is provided that enables client computers on a network to be identified and to be automatically added to a backup database without the necessity of user or administrator intervention. Moreover, in enterprises with many sites having their own LANs and local backup servers, mobile clients can be automatically authenticated and added to the local backup database so they can be backed up. Furthermore, since the process avoids the need for passwords to access the clients, system administrators can push install backup software automatically on clients. This results in a substantial reduction in the time and effort required to configure clients in network environments.

While the foregoing has been with reference to particular embodiments of the invention, it will be appreciated by those skilled in the art that changes in these embodiments may be made without departing from the principles and the spirit of the invention, which is defined in the appended claims.

The invention claimed is:

1. A method of automatically authenticating a client computer for backup by a backup computer comprising:
obtaining by the backup computer first information from the client computer that identifies the client computer;
identifying from the first information whether the client computer is included in a backup database for backup by the backup computer;
upon determining that the client computer is not included in the database, requesting from the client computer second information comprising client status information containing a key hash of a number and a key value encrypted by the client computer using one of a plurality a public keys stored in the client computer, said plurality of public keys including a public key corresponding to a private key of said backup computer;
decrypting the encrypted second information using the private key of the backup computer;
determining whether the decrypted second information includes an expected key hash;
adding the client computer to the backup database for backup upon the decrypted second information containing said expected key hash;
upon the decrypted second information not including said expected key hash, requesting the client computer to encrypt the second information using another one of said plurality of stored public keys, and repeating said decrypting and said determining steps.

2. The method of claim 1, wherein said adding comprises using the key value in an encryption algorithm to communicate encrypted login information to the client computer from the backup computer.

3. The method of claim 2, wherein said key hash is of a random number generated by the client computer, and the first information comprises said key hash being obtained unencrypted by the backup computer.

4. The method of claim 3 wherein said determining comprises comparing the unencrypted key hash of the first information with a decrypted key hash of the second information to determine whether the key hashes match.

5. The method of claim 4, wherein, upon said unencrypted and decrypted key hashes not matching, repeating said requesting, said decrypting, and said comparing-until said key hashes match.

6. The method of claim 1 further comprising password protecting the private key in the backup computer.

7. The method of claim 1, wherein said client computer and said backup computer are connected by a network having a plurality of computers, said plurality of computers comprising said client computer, and wherein said method further comprises broadcasting by said backup computer to said plurality of computers a request for said first information, the first information including an identity of each computer; receiving responses to said request; and said identifying comprises determining from said responses whether the client computer is included in said backup database.

8. The method of claim 7, wherein said network is connected to a plurality of other networks, each of said other networks having a backup computer for backing up client computers on such other networks, and wherein each of said backup computers has a private key, and the client computers of each of said other networks have a plurality of stored public keys corresponding to the private keys of the backup computers of the other networks.

9. The method of claim 8 further comprising installing on said client computer said plurality of public keys that correspond to the private keys of the backup computers on said networks, and authenticating said client computer on a backup computer of one or more of said networks using appropriate ones of said plurality of public keys installed on said client computer.

10. The method of claim 9, wherein said installing further comprises installing client backup software that cooperates with server backup software installed on said backup computers.

11. The method of claim 10, wherein said plurality of public keys and said client backup software are stored on and installed from storage of a server on said network.

12. The method of claim 1 further comprising push installing on said client computer client backup software that cooperates with server backup software on the backup computer, and installing with said client backup software said plurality of public keys that correspond to respective private keys of a plurality of backup computers.

13. Computer readable media comprising storage media storing instructions for controlling a computer system to perform a method for authenticating a client computer for backup by a backup computer, the method comprising:
obtaining first information from the client computer that identifies the client computer;
identifying from the first information whether the client computer is included in a backup database;
upon determining that the client computer is not included in the database, requesting from the client computer second information comprising client status information containing a key hash of a number and a key value encrypted using one of a plurality of public keys stored in the client computer, said plurality of public keys including a public key corresponding to a private key of said backup computer;
decrypting the encrypted second information using the private key of the backup computer;
determining whether the decrypted second information includes an expected key hash;
adding the client computer to the backup database for backup upon the decrypted second information containing said expected key hash;
upon the decrypted second information not including said expected key hash, requesting the client computer to encrypt the second information using another one of said plurality of stored public keys, and repeating said decrypting and said determining steps.

14. The computer readable media of claim 13, wherein the method is performed by said backup computer.

15. The computer readable media of claim 14, wherein said adding comprises using the key value in an encryption algorithm to communicate encrypted login information to the client computer from the backup computer.

16. The computer readable media of claim 14, wherein said client computer and said backup computer are connected by a network comprising a plurality of computers, said plurality of computers including said client computer, and wherein said requesting comprises broadcasting to said plurality of computers a request for said first information, the first information including an identity of each computer; receiving responses to said request; and identifying from said responses whether the client computer is included in said backup database.

17. The computer readable media of claim 16, wherein said determining comprises comparing an unencrypted key hash of the first information with a decrypted key hash of the second information to determine whether the key hashes match, and upon said key hashes not matching, the instructions causing the client computer to encrypt the second information with another of said plurality of public keys; and repeating said decrypting, said comparing and said adding steps.

18. A system for automatically authenticating a client computer for backup, comprising a backup computer; a backup database storing identities of computers for backup; and computer readable media comprising computer program code instructions for controlling the operation the backup computer to receive first information from the client computer that identifies the client computer and to identify whether the client computer is included in the backup database; upon determining that the client computer is not included in the database, to receive second information from the client computer, the second information comprising client status information containing a key hash of a number and a key value encrypted using one of a plurality of public keys in the client computer, said plurality of public keys including a public key corresponding to a private key of said backup computer; to decrypt said second information using the private key in said backup computer; upon the decrypted second information containing an expected key hash, to authenticate the client computer, and upon the decrypted second information not including said expected key hash, to request the client computer to encrypt the second information using another one of said plurality of stored public keys, and to repeat said decrypting and said determining steps.

19. The system of claim 18, wherein said backup computer and said client computer are connected to a local network of an enterprise having a plurality of connected computers, said plurality of connected computers including said client computer, each connected computer having a plurality of public keys, at least one public key corresponding to the private key of the backup computer and other ones of the public keys corresponding to the private keys of other backup computers on other networks of said enterprise, and wherein said instructions authenticate and add authenticated ones of such computers to backup databases of said other networks.

20. The system of claim 19, wherein said backup computer periodically broadcasts requests for identity information to said connected computers to identify computers that have not been authenticated on the local network.

* * * * *